United States Patent [19]

Eder et al.

[11] Patent Number: 5,055,339

[45] Date of Patent: Oct. 8, 1991

[54] SHAPED ELEMENTS

[75] Inventors: Bernhard Eder, Linz/Donau; Hans Bürger, Traun; Franz Reitinger, Rottenegg, all of Austria

[73] Assignee: Schaumstoffwerk Greiner Gesellschaft m.b.H., Kremsmünster, Austria

[21] Appl. No.: 377,247

[22] Filed: Jul. 7, 1989

[30] Foreign Application Priority Data

Jul. 14, 1988 [AT] Austria ................................. 1811/88

[51] Int. Cl.[5] .............................................. B32B 3/26
[52] U.S. Cl. .................................... 428/157; 264/45.3; 428/159; 428/316.6; 428/317.1; 521/54
[58] Field of Search ............... 264/45.3; 428/159, 160, 428/316.6, 317.1; 521/54

[56] References Cited

U.S. PATENT DOCUMENTS

| 3,114,722 | 12/1963 | Einhorn et al. | 521/54 |
| 3,256,218 | 6/1966 | Knox | 264/45.3 |
| 4,307,200 | 12/1981 | Lichter et al. | 521/54 |
| 4,714,715 | 12/1987 | Mosier | 521/54 |

FOREIGN PATENT DOCUMENTS

3627431 3/1987 Fed. Rep. of Germany .

*Primary Examiner*—William J. Van Balen
*Attorney, Agent, or Firm*—Collard, Roe & Galgano

[57] ABSTRACT

A shaped element consists of a soft and preferably elastic foamed material, comprising cellular webs which have been deformed remanently at least over areas. The shaped element is formed from a foamed material granulate, a soft foamed material having a grain size of 2 to 20 mms and filler material, for example cork granulate, rubber granulate, chalk, calcium carbonate, hard polyurethane scraps or thermoplastic plastics material scraps, with a grain size of 2 to 20 mms, which are distributed in the soft foamed material by the foaming action. The cellular webs or walls between the individual floccules of the foamed material granulate and/or of the filler material are remanently deformed over the areas concerned.

17 Claims, 4 Drawing Sheets

SHAPED ELEMENTS

FIELD OF THE INVENTION

The invention relates to a shaped element or moulding formed from a foamed material panel of a soft and, if appropriate, elastic foamed material comprising cellular webs or walls which are permanently deformed at least in some areas. The invention also relates to a method of producing such a shaped element or moulding.

BACKGROUND OF THE INVENTION

There are disclosed in DE-A-36 27 431 mouldings of plastics material foam which is of different density in different layers of the moulding. Mouldings of this kind may be compacted to different extents over different areas, the density of the material being approximately identical in such differently compacted areas for areal units of identical size, whereas the thickness of the moulding varies. Such mouldings may be provided with coating layers of different structure, or to incorporate bearing elements in the mouldings. The materials used for the production of such mouldings consists of soft foamed material the cellular structure of which is compacted in marginal portions of the mouldings. Mouldings of this kind are used as sound damping elements although the mechanical strength of such mouldings is inadequate for some purposes.

For packaging purposes, in particular, composite panels or slabs of plastics materials may be filled with plastics material scraps. Because of the large number of open cells in a soft foamed material of this kind the individual parts of the expanded material granulate, or the individual parts of the filling material adhere to one another only via the cellular grid, so that the foamed material granulates, or the filling materials break off under stress. Such panels are of low mechanical strength.

SUMMARY OF THE INVENTION

An object of the present invention is to provide a shaped element or moulding which is simple to manufacture and is of different densities, and is adapted to different mechanical stresses, in particular to end pressure, whilst retaining its fundamental elastic properties. Another object of the invention is to provide a method of producing such a moulding.

According to one aspect of the invention the foamed material panel has included in it by foaming action, material granulates of a soft foamed material and of a grain size of 2 to 20 mms, with other filling materials, for example cork granulate, rubber granulate, chalk, calcium carbonate, hard polyurethane scraps or thermoplastic plastics material scraps in grain sizes of 2 to 20 mms, distributed within the foamed material. The cellular webs or walls between the individual floccules of the foamed material granulate and/or of the filling material, as well as the cellular webs or walls of the foamed material granulate, and if applicable the webs or walls of the filling materials, are equally permanently deformed.

The application of particular percentages of foamed material granulate and filling materials, respectively, allows the volumetric weight or density of the foamed material slab or panel to be altered easily and the individual granulates of the foamed material or filling material, respectively, to be mounted in substantially oscillation damping fashion by way of the cellular webs or walls of the soft, elastic foamed plastics material. If the shaped element or moulding is subjected to end pressure or higher overall stress, the bond between the individual granulates of the foamed material or the filling material, respectively, may be varied and primarily enhanced by the deformation occurring under the action of pressure and temperature. By virtue of the compression of the cellular lattice, that is to say of the cellular webs or of walls, and of the preceding heating action, a greater number of connecting webs adheres to the separate floccules, or rather, the cellular webs or walls are indirectly reinforced by said deformation and are thus more highly stressable. The load-carrying capacity of the shaped element or moulding may thus be adapted to different applications starting with a panel of composite plastics material of uniform density by compaction and thus consolidation to different extents of the starting panel of composite plastics material. An unexpected advantage of the invention however consists in that said compaction not only alters the density, but also the oscillatory behaviour of the foamed material granulates or of the filling materials, which additionally changes the sound absorption and reflective properties of the shaped element or moulding which may accordingly be used not only for cladding purposes, but simultaneously also, for sound damping within a required frequency range, or may easily be adapted to such application, starting with an identical initial product.

The moulding or shaped element may be formed by several panels of composite plastics material compacted to different densities and joined together via adhesive layers, whereby the required mechanical properties can be simply combined with the sound and oscillation damping properties required for a particular application, since the individual layers may be compacted to a particular density or filled with different filling materials or foamed material granulates. The proportions by weight of the foamed material granulates or filling materials of the individual panels may differ, whereby the density and thereby the sound and oscillation absorption properties can readily be varied.

A fusible powder for example a phenolic resin powder and/or a fusible adhesive foil, may be placed between two panels of composite plastics material, as an adhesive, since the heating action to which the panels are subjected before their deformation causes the fusion of said powders or foils to bond the panels together or to bonding coating layers thereto. By virtue of the application of said fusible powders, the penetration thereof into the open cells of the cellular lattice of the panels may, apart from joining the panels, also cause reinforcement thereof by consolidation of their surface sections and thus allow complementary reinforcement of the cellular lattice to be obtained at optional points of a shaped element or moulding.

Reinforcing elements of metal and/or plastics material may be installed in a recess or cavity in a panel of composite plastics material, or between two such panels, thereby allowing an intimate joint to be produced between reinforcing elements and panel, for example during the compacting operation. The reinforcing elements to also be employed for attachment and retention of the shaped elements or mouldings, by embedding them therein. The resistance of such reinforcing elements to being torn out may be simply enhanced by increasing the extent of the compaction and the density of the panels in the area of the reinforcing elements. By virtue of such intensive inter-bonding over a large area very substantial forces may be transmitted from the reinforcing elements to a shaped element or moulding or from such element or moulding to anchoring means without separating the panels and the reinforcing elements. The advantages of their adaptation to requirements of damping and mechanical strength, respectively, enables the panels to be used not only for plate-like but also for spatially deformed structural components.

Said panels of composite plastics material may be compacted to different densities in areas distributed over their surfaces, high strength and stressability of the shaped elements or mouldings thereby being obtainable in fastening areas, for example, whereas the required damping properties may be provided in areas adjacent thereto, for example for sound damping or for the absorption of the shock of impinging objects, as would be advantageous for example for motor vehicle cladding elements.

The cellular webs and/or walls of the individual panels of composite plastics material may also be deformed to different extents so that they have different density values but approximately identical proportions of soft foamed material granulate and filling materials. Panels of varying density can therefore be produced from plastics material panels of substantially identical composition.

The reinforcing elements may be in the form of fibre fleeces, knitted or woven fabric, wool, metal, glass, carbon or plastics material, threads or fibres, or plastics material foils, the tensile and breaking strength of the panels or of structural components produced therefrom being thereby raised without substantially affecting their damping properties.

According to another aspect of the invention there is provided a method of producing shaped elements from panels of foamed material, in which method liquid plastics material is mixed with fillers which are then placed into a block mould together with a liquid raw material of a foaming substance and a block of foamed material is produced by reaction of the liquid foaming substance. The foamed material block is then divided into panels of foamed material, the panels of foamed material being then deformed at least in some areas thereof under the simultaneous action of temperature and pressure, to provide a shaped element having a desired form and a density differing from the original density of said panels. Said shaped element is then trimmed if appropriate. The method is characterised in that soft foamed material and optionally scrap having different coatings, are comminuted into a soft foamed material granulate having a grain size of 2 to 20 mms and are thereupon mixed with a variety of fillers, for example cork granulate, rubber granulate, chalk, calcium carbonate or hard polyurethane scraps and in particular ground integral elements or thermoplastic plastics material scraps of a grain size of 2 to 20 mms, with a liquid raw material for a soft and/or elastic foamed material. Such mixture is placed in a block mould, whereupon the block of foamed material is cut up into panels of composite plastics material, which are heated to a temperature of for example 120° to 250° C. and are then deformed under the action of pressure and temperature. By virtue of the method, numerous material which previously could only be made harmless with difficulty can be used for the production of shaped elements from panels of foamed material. Also, panels of foamed material primarily for sound damping or impact absorption can be produced. Further the production of sound damping panels or shaped elements for use simultaneously for sound damping and also for impact absorption, is simplified and the cost of their production is reduced, since it need no longer be ensured that scrap produced during production of expanded materials is made harmless. Adequate heating of the cell structure, and of the cellular webs and cellular walls as far as the core of the panels by the heating operation preceding the shaping operation ensures that despite the extensive insulating action of such materials, the subsequent compression occurs with optimum uniformity throughout the depth of the panels and the deformation performed is remanent. That is to say that elastic restoration occurs only to a very slight extent, or not at all. The compression following appropriate preheating furthermore assures that the deformed cellular webs or walls or rather the compressed cellular lattice, may be connected or rather bonded more intimately to the foamed-in foamed material granulates or filler substances. This allows the physical properties of the panels to be altered, and in particular the mechanical stressability of panels of composite plastics material to be increased.

The mixture may incorporate 0 to 50 parts by weight of filler substances, 5 to 25 parts by weight of raw material for a soft expanded material, in particular polyol and isocyanate and the residual fraction up to 100 parts by weight being granulate of foamed material, whereby the density and intrinsic mechanical strength factors can be altered. The foamed material granulate and the filler substances may be placed in a mixing drum after weighing and then intermixed, whereupon the components of the liquid raw material are metered, mixed with one another and the raw material is then charged into the mixing drum and intermixed with the foamed material granulate and the filler substances which are present in the mixing drum, to form the composition. Uniform distribution of filler substances, foamed material granulates and liquid plastics material thereby occurs throughout the volume of the foamed material panel or shaped element, so that the forming of shrink holes or clusters is prevented to an optimum degree. The above sequence also has the advantage that the incorporation of the liquid raw material which is to a particular extent sticky, causes the surface of the filler substances and foamed material granulates to be wetted by the sticky raw material after they have intermixed. Such slight adhesive action may prevent the heavier filler substances or foamed material granulates from sinking to the bottom of the mould, without additional measures, after the mould has been charged. Uniform expansion and uniform structure of the cellular lattice may thereby also be provided between the filler substances and the foamed material granulates. A quasi-uniform foamed material panel structure is thereby obtained to provide for different damping actions such as impact damping and sound damping.

The composition is preferably charged into the block mould from the mixing drum, since the soft foamed material granulate and the filler substances are thereby kept in the form imparted to the composition without supplemental measures, until the reaction of the raw material, has been completed.

The foamed material granulate and the filler substances may be wetted omnilaterally by the raw material, to establish a bond between the floccules of the foamed material granulate and the filler substances, which bond is effective in all spatial directions of the panel of composite plastics material.

The humidity required to form the composition may be fed in after intermixing the foamed material granulate and/or the filler substance with the raw material, to obtain a preponderantly open-celled soft foamed material, whereby the foaming operation can be already initiated during the introduction of the composition into the block mould and the production period of the panel of composite plastics material shortened.

The humidity may, however, be fed in immediately after starting to charge the composition into the block mould, since premature expansion of the raw material and thus clogging of the mould inlet may thereby be reliably prevented.

The humidity may be fed into the block mould or ingot mould in the form of a vapour, so that the contents of the ingot mould can react completely within a comparatively short period and the expansion period during which the block of expanded material has to remain in the ingot or block mould is thereby considerably shortened.

The panel of composite plastics material may be spatially deformed, since the advantages of the damping action and improved physical properties can also be used for complex or difficult spatial elements and new spheres of application may thereby be created for the panel of composite plastics material.

The panel of composite plastics material to be deformed to different extents in mutually spaced apart areas since, starting from the same intrinsic material, greater strength can be provided in the attachment areas than in the areas adjacent thereto which are used primarily for sound or impact damping.

The cellular webs and/or walls of the preponderantly open-celled soft foamed material may be permanently deformed under the action of pressure and temperature, thereby securing a remanent reduction of the thickness of the shaped element or foamed material panel and the "collapse" of the cellular lattice resulting in compaction of the spatial framework which is then able to withstand higher stresses.

The cellular webs and/or walls of the soft foamed material as well as of the foamed material granulate, and if appropriate of the filler materials, may be at least partly deformed remanently, since the course followed in the process causes the overall structure of the foamed material panel or shaped element to be compacted by virtue of such compaction or "cracking" action.

Fusible powder and/or fusible bonding foils may be applied to one or more surfaces of the panel of composite plastics material prior to the heating step in particular, whereby the application of liquid adhesives and the handling of components coated with liquid adhesives is avoided.

Coating layers may be applied to one or more surfaces of the panel of composite plastics material prior to heating. For example a fibrous fleece, a knitted or woven fabric of natural or synthetic fibres, or plastics material foils, may be bonded by heating, in particular during the preheating of the panel of composite plastics material, by fusion of its surface or of the fusible powder or of the adhesive fusible foil, after which the panel of composite plastics material is deformed, so that the heat required for the compaction may simultaneously also be employed for bonding the panels of composite plastics material with different coating layers or for joining different panels of composite plastics material. The brushing on of adhesive, and clamping the panels to await the elapse of time of the adhesive can therefore be omitted.

Several panels of composite plastics material, having different wall thicknesses in particular, may be joined to form a panel or a slab of sandwiched composite plastics material panels, by means of layers of adhesive, for example of adhesive fusible powder or adhesive fusible foils. Layers of different density can thus be joined together seamlessly as a function of the desirable absorptive or damping properties against mechanical stresses or for sound damping. By virtue of the unitary joint deformation of the layers, a uniform damping value may also be obtained in the finished shaped element, throughout its surface.

Reinforcing elements of metal and/or plastics material may be placed between the separate composite plastics material panels and be spatially deformed together with the composite plastics material sandwich slab, whereby there can be formed robust fastening points or stressing areas for strains which cannot be borne by the composite plastics material panel alone, although a greater strength is already provided by combining several layers by the use of several composite plastics material panels to form a composite plastics material sandwich slab.

Reinforcing elements of metal and/or plastics material may be placed in recesses or cavities of composite plastics material panels, thereby preventing excessive compaction in the parts of such panels into which the reinforcing elements are inserted and allowing an approximately identical density to be provided even in the areas of the inserted elements, following the compaction of the composite plastics material panels or rather the production of the shaped element.

A preheated composite plastics material panel or slab may be placed in the press mould and compacted to a higher initial volumetric weight by remanent deformation of the cellular walls or cellular webs, after which, and if appropriate, after the incorporation of a fusible powder and/or of an adhesive fusible foil, a second composite plastics material panel is compacted by remanent deformation of its cellular webs and/or walls to a second volumetric weight differing from the original or initial volumetric weight. Reinforcing elements are preferably inserted between the two panels of different density and possibly different filling density of foamed material granulates or filler materials, respectively being combined into a shaped or moulded element in the composite plastics material sandwich slabs.

A press form top may be exchanged after compaction of the initial composite plastics material panel and prior to the compaction of the subsequent composite plastics material panel. This makes it possible to perform different compacting operations in the composite plastics material panels to different densities by means of a single mould.

The inserted reinforcing elements may be joined to the directly adjacent composite plastics material panels of soft foamed material by way of the surfaces in fusion of the composite plastics material panels or soft foamed material directly adjacent to these or by way of adhesives, for example, adhesive fusible foils or fusible powder, which are activated in particular by heat and/or the act of pressure, so that it is possible in combination with the compaction or increase in volumetric weight or deformation of the composite plastics material panels to join these to reinforcing elements or other composite plastics material panels in a single operation and thereby to shorten production time.

The deforming action on the composite plastics material panels or composite plastics material sandwich slabs may be terminated 0.05 mm to 0.5 mm before the parting plane of the press mould, so that the panels or shaped elements can simultaneously be exposed to further processing by use of the same mould after completion of the pressing operation and expiry of the corresponding curing period. A stamping or punching operation may for example be undertaken by virtue of the residual stroke between the individual shaped or moulded elements.

The pressed shaped elements can be urged against one another after the deformation period has elapsed and an outline and/or excisions such as for example cutaway sections, fastening holes, perforations or the like can be punched out, whereby a shaped or moulded element having the appropriate surface coatings and which is ready for installation, can be produced.

DETAILED DESCRIPTION OF THE INVENTION

Figure 1:
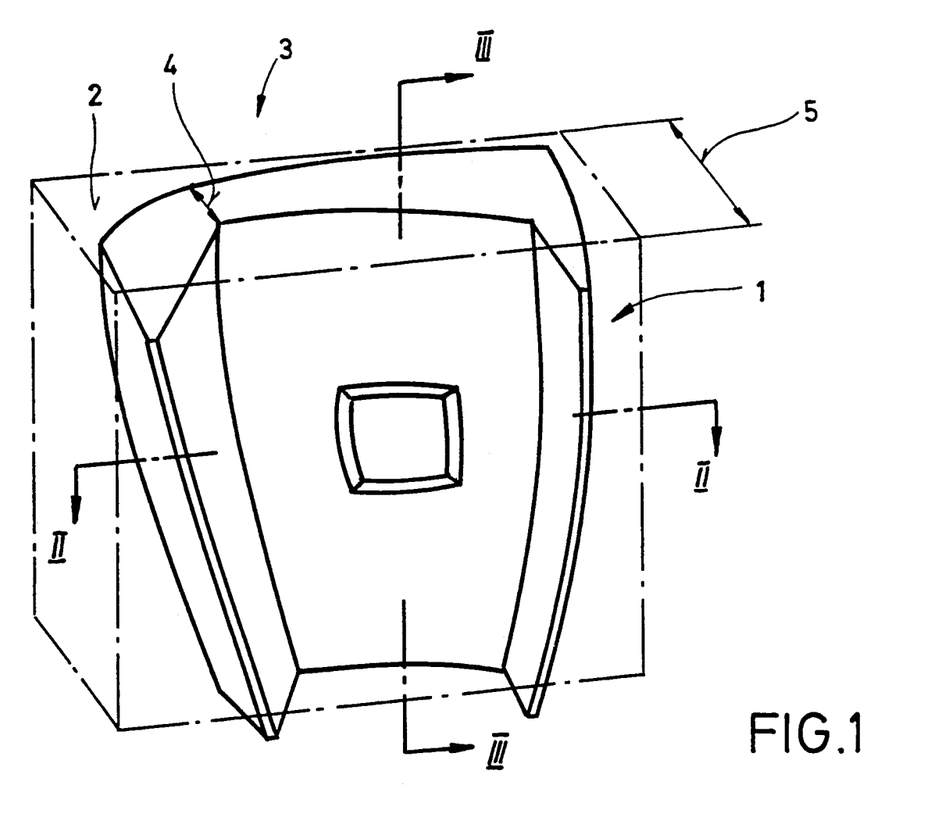
FIG. 1 is an isometric view of a formed shaped or moulded element.

There is shown in FIGS. 1 to 5, a shaped element 1 formed by deformation of a composite plastics material panel 2 illustrated in broken lines. The shaped element 1, may for example be an insert element for a motor vehicle cladding member. The panel 2 was spatially deformed, i.e. curved, as well as compressed to varying thicknesses. As shown in FIG. 1 the shaped element 1 has a thickness 4 in the area of an end side 3, which is no more than approximately half as great as the thickness 5 of the panel 2 prior to its deformation.

Figure 2:
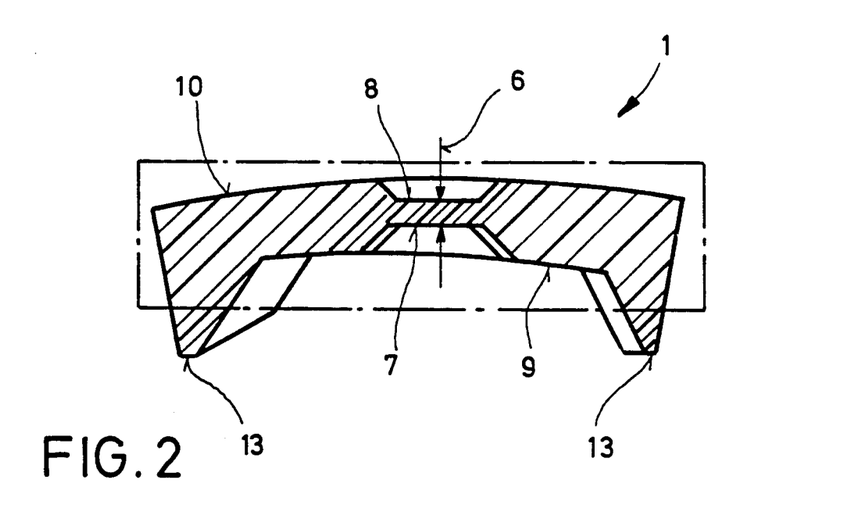
FIG. 2 is a view taken only the lines II—II in FIG. 1.

As will be apparent from FIG. 2, a wall thickness 6 of the element 1 is even substantially smaller than the thickness 4. In order to show the variation in density arising from the varying degrees of deformation of the panel 2 and the consequent variation in weight in relation to volume applicable to an identical unit having a volume of one cubic millimetre, for example, the density of the hatching in FIG. 2 approximately matches the variations in density in the shaped element 1. Said hatching indicates that the density of the element 1 is greatest in the area of recesses 7 and 8 in the opposed surfaces 9 and 10 of the element 1, although the volumetric weight per unit is approximately unchanged. The density and volumetric weight of the element 1 is smaller between the recesses 7 and 8 and a marginal enlargement 11 (FIG. 3) than between the recesses 7 and 8 but is higher for example than in the area of a marginal enlargement at: which the panel 2 was compacted only to a small extent.

Figure 3:
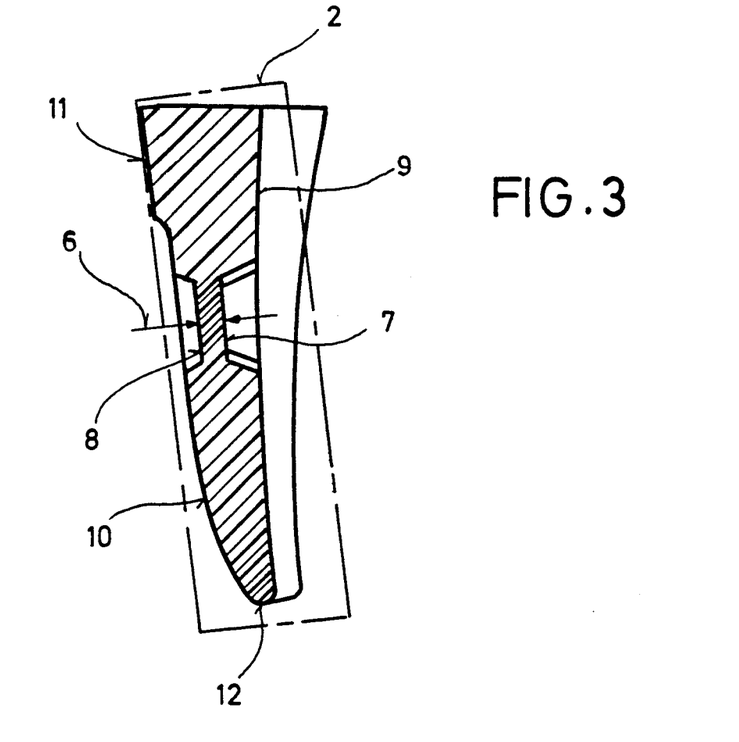
FIG. 3 is a view taken only the lines III—III in FIG. 1.

As shown in FIG. 3, the density increases evenly in the volume tapering down towards the end 12 from the recesses 7 and 8, in the direction towards the tip of the element 1. The same is true of the portions tapering down towards the lateral edges 13, (FIG. 8) in which the density and thus the volumetric weight per unit of volume increase in proportion to the reduction in wall thickness.

Figure 4:
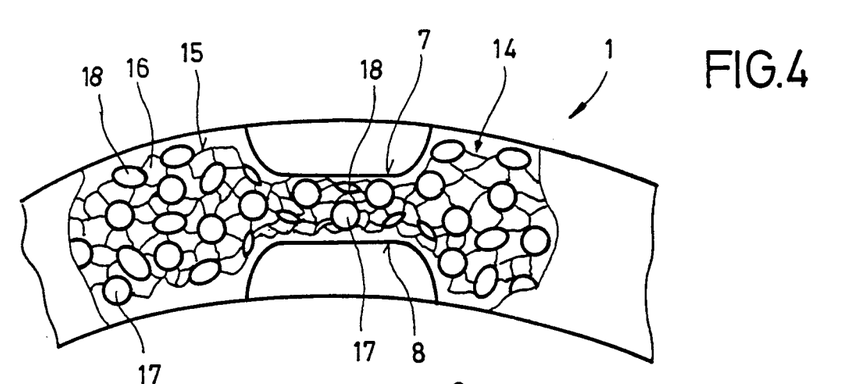
FIG. 4 is an enlarged view illustrating details of FIG. 2.

As best seen in FIG. 4, the sectioned part of which is shown diagrammatically and in considerable distortion as to scale, in the interest of emphasis, the commensurately intensive preheating of the foamed material panels produces, irrespective of the extent of compaction, approximately linear compaction of a cellular lattice 14 which comprises cellular webs 15 deformed to a greater or lesser extent, which define between them open cells 16. The cellular lattice 14 extends between the filler materials 17 indicated diagrammatically by circles, or the foaming material granulates 18 indicated diagrammatically by ellipses, of a soft foamed material. The filler materials 17 may be formed by cork granulate, rubber granulate, chalk, calcium carbonate or ground up hard polyurethane scrap, for example integral or RIM pieces and thermoplastics material scraps. The foamed material granulates 18 are commonly formed by foamed polyurethane material scrap, in particular by soft foamed materials which are for example also provided with a variety of coatings, for example synthetic leather fabric or the like. The foamed materials as well as the filler materials are comminuted in appropriate mills to grain sizes of between 2 mms and 20 mms. As will be apparent from FIG. 4 in the varying density portions, for example between the recesses 7,8 and the adjacent portions, the cellular lattice 14 is disposed between the filler materials 17 and the foamed material granulates 18.

Figure 5:
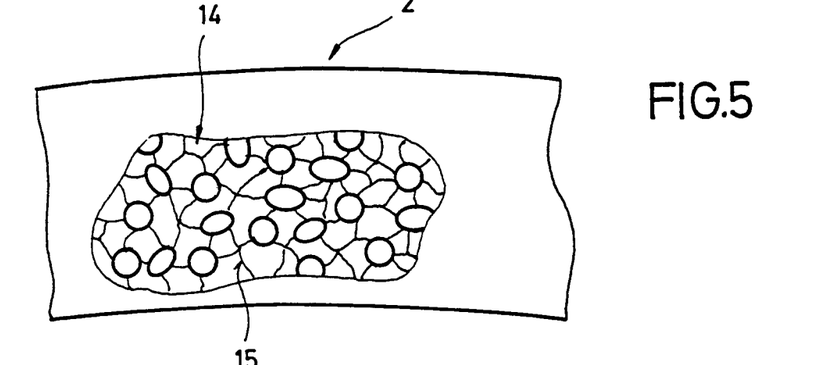
FIG. 5 is a side view of part of a composite plastics material panel, shown partly in section.

FIG. 5 shows a composite plastics material panel 2 before it has been deformed into the shaped element 1. As shown, the cellular webs 15 of the cellular lattice 14 are formed in the manner of circumferential lines of a sphere. In contrast thereto the webs 15 in the element 1 are permanently deformed by the action of temperature and pressure in the portions of the shaped element 1 close to the recesses 7 and 8, as indicated diagrammatically in FIG. 4 so that the separate filler materials 17 and /or the foamed material granulates 18 interspersed therebetween are already positioned closer to each other than is the case in the undeformed panel as shown in FIG. 5.

As will also be apparent from FIG. 4, the cellular lattice 14 is almost wholly compacted or fused in the area between the recesses 7 and 8 by the great compaction of the panel 2, so that the filler materials 17 and the foamed material granulates 18 are placed in almost direct contact or adhere to one another and thus form a quasi-compact element. Also as shown diagrammatically in FIG. 4, the great compaction of the cellular lattice 14 in the area of the recesses 7 and 8 also causes the foamed material granulates 18 to be compressed and compacted to a greater extent. The smaller height of the ellipses indicating the foamed material granulates 18, illustrates this diagrammatically in FIG. 4. FIGS. 4 and 5 are, however, merely graphic illustrations facilitating an understanding of the present invention and, therefore, show considerable distortion of the external shapes of the individual components as well as of their dimensional proportions.

Figure 6:
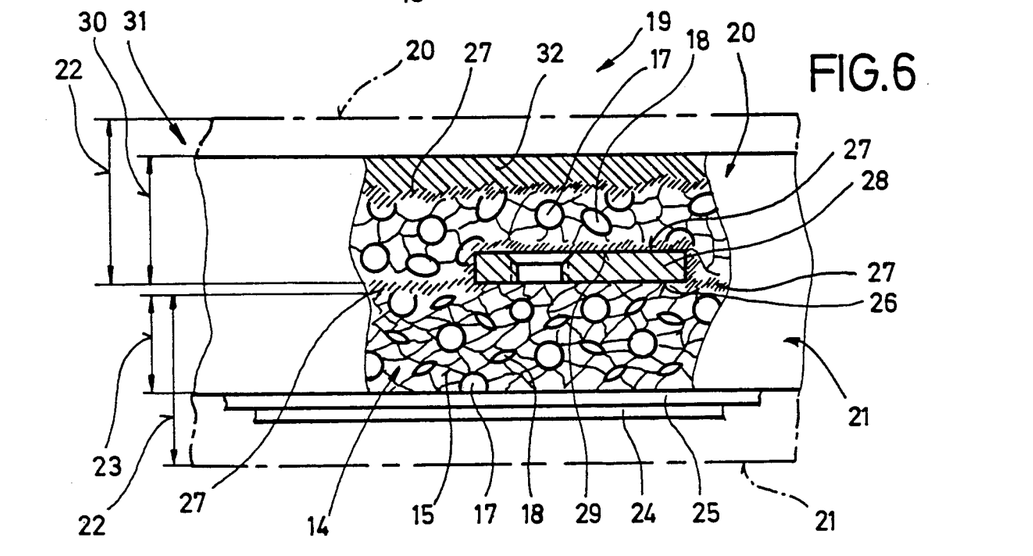
FIG. 6 is an enlarged diagrammatic side view of a further shaped element of composite plastics material, shown partly in section.

As will further be apparent from FIG. 4, the compression of the cellular lattice 14 reduces the gaps between the individual bearing points of the cellular lattice thus providing more reinforcements between the individual foamed material granulates 18 and filler materials 17, respectively. The resistance against deformation of the shaped element is thus increased thereby augmenting its resistance to mechanical stress. Part of a shaped element 19 comprising two composite plastics material panels 20 and 21 is shown in FIG. 6. The initial thickness 22 of the composite plastics material panel 20 is indicated by broken lines. The panel 21 has an initial thickness 22, however, which corresponds to that of the composite plastics material panel 20 at the start of the production of the shaped element 19. The panel 21 is first placed in a mould for the production of a shaped element and is compressed to a thickness 23 corresponding to approximately half the initial thickness 22. As indicated diagrammatically by the shape of the foamed material granulates 18 and of the filler materials 17, these are also compressed spatially, such volumetric change being more noticeable in the case of the foamed material granulates 18 since they consist of soft foamed material, whereas the filler materials 17, being for example rubber granulate or cork granulate, remain almost unchanged in shape even under most extensive compaction of the panel 21. The primary result of said compaction is that the cellular lattice 14 collapses between the foamed material granulates 18 and filler materials 17 and the original spheroidal shape of the cellular web or walls is broken up or warped depending on the extent of compaction. This causes a compaction of the bearing points between the foamed material granulates 18 and filler materials 17 and an increase in mechanical strength, apart from an increase in density of the panel. At the time of the compaction of the composite plastics material panel 21, there may be included in the mould a covering layer 24, for example not only a fibrous mat or a leather or synthetic leather element, but also a woven or knitted fabric of different fibres. There may be applied to the covering layer 24 an adhesive fusible foil 25, for example a polyethylene foil, on which the panel 21 to be compacted, is placed. The foil 25 is melted by the high temperature of the panel 21, which is needed to allow deformation of the cellular lattice 14, as well as by optional supplemental heating of the mould; so that the covering layer 24 and the composite plastics material 21 are joined in interengaging relationship.

The mould is opened upon completion of the compaction of the panel 21, and a fusible powder 27 indicated by hatching being, for example a phenolic resin powder, is sprinkled on the surface 26 facing away from the covering layer 24. A reinforcing element 28, which may be constituted by a plate of metal or of plastics material, or by fibrous mats or the like, may simultaneously also be placed on the surface 26 of the panel 21. An upper side 29 of the reinforcing element 28 facing away from the panel 21 may also be sprinkled with said fusible powder 27, and the panel 20 placed thereon and, after closing the mould, compacted to a thickness 30, for example by 20%. This compacting operation causes enhanced bonding, by the action of adhesive or pressure on the foamed material granulates 18 and filler materials 17 of which the spatial shape is practically unchanged, thereby increasing the mechanical strength of the shaped element whilst retaining elasticity for the absorption of mechanical impacts. At the same time, the panel 20 is deformed more extensively in the area of the reinforcing element 28, so that the latter is embedded in the panel 20 and is supplementally also bonded thereto or to the panel 21 by means of the fusible powder 27.

As shown diagrammatically by the hatching illustrating the fusible powder 27, a part of the fusible powder 27, when it has been liquified, penetrates into, and fills, the surfaces 26 of the panels 20 and 21, so that the fusible powder serves to consolidate the surfaces 26. The layer of adhesive formed by the fusible powder 27 is also a reinforcing element, primarily if the fusible powder is a phenolic resin powder, since the layer of fusible powder constitutes a reinforcing element in the panel 31 from which the shaped element 19 is produced.

A covering or coating layer 32 which may be provided by a diversity of materials, for example a sheet metal panel or the like, may be placed on the shaped element 19 simultaneously with the compaction of the composite plastics material panel 20 or following such compaction, by placing a fusible adhesive foil 25, or sprinkling fusible powder 27 on a surface 26 of the panel 20.

Figure 7:
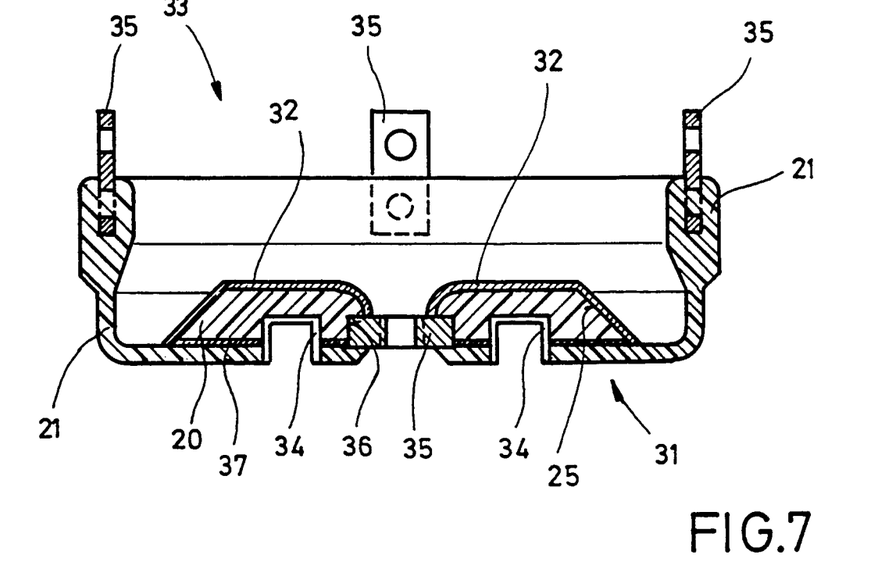
FIG. 7 is a side view shown partly in section of another shaped element of composite plastics material, having reinforcing elements incorporated therein.

A further shaped element 33 is shown in FIG. 7 some parts of which merely comprise a composite plastics material panel 20 which is reinforced in other parts by means of another composite plastics material panel 21. A covering layer 32 is applied to one side of the shaped element 33. The production of such a shaped element 33 can now be performed by initially inserting a precut section of a composite plastics material panel 20 deformed into the shape shown in FIG. 7. The covering layer 32 may for example be bonded to the composite plastics material panel 20, at the same time.

The supplemental composite plastics material panels 21 may then be joined to the panel 20 after preliminary insertion of reinforcing elements 34,35, in an additional operation or in several additional operations. A recess 36 may also be excised from the panel 21, prior to said insertion, for the reception of a reinforcing element 35 provided with a screwthread, for example, so that there is no excessive compaction of the panel 21 in the area of the recess 36. If the panel 21 is of appropriate thickness, the end section receiving the reinforcing element 35 can be produced in one operation from the panel 21.

Bonding between the individual composite plastics material panels 20 and 21 into a composite plastics material sandwich slab 31, especially in the area of the reinforcing elements 34 and 35, can be established by inserting fusible adhesive powder, or by means of a layer of adhesive 37 constituted by a fusible adhesive foil.

Figure 8:
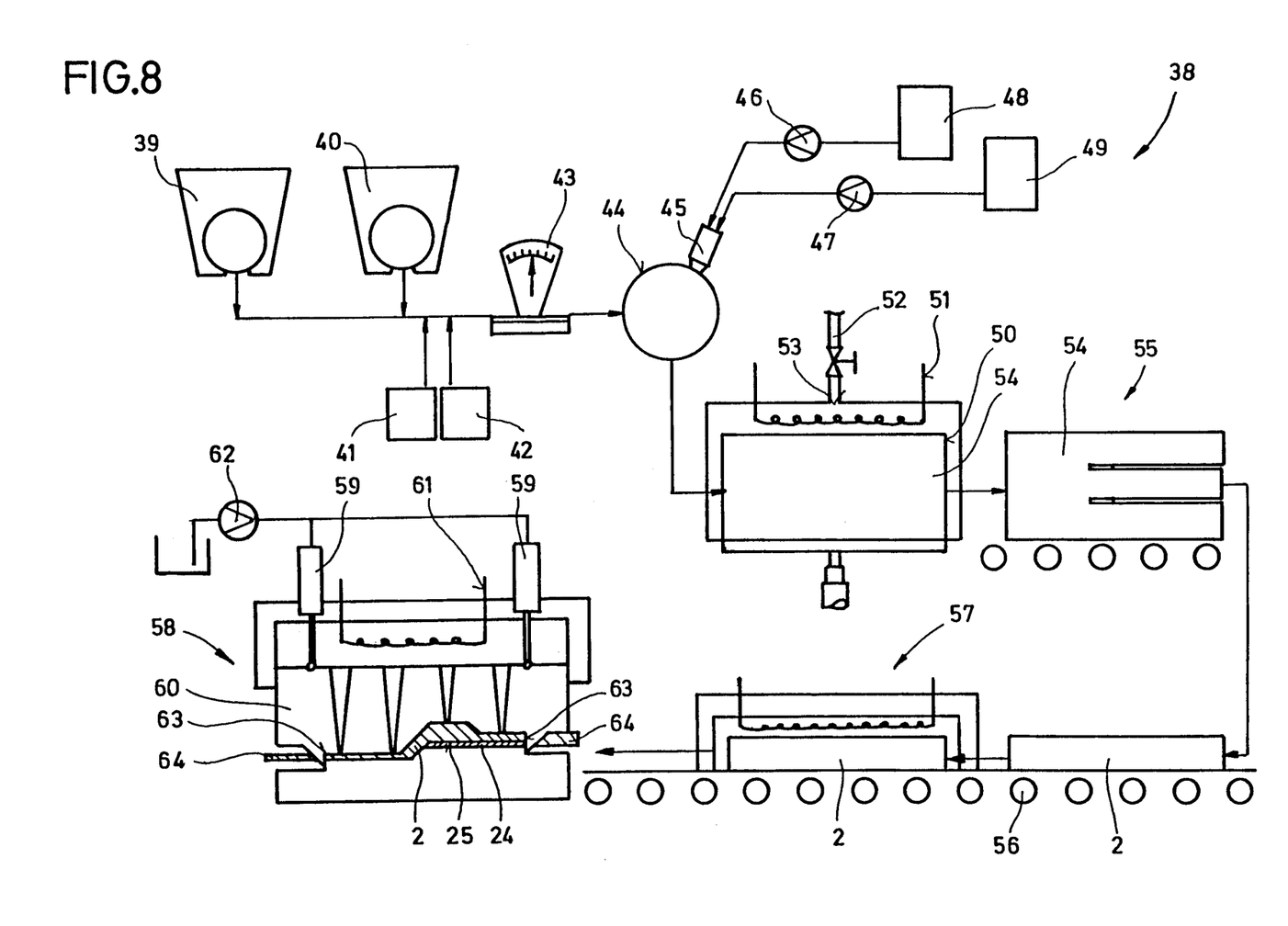
FIG. 8 is a block schematic, simplified, diagram of a plant for the production of shaped or moulded elements.

FIG. 8 is a block circuit diagram of a plant 38 for the production of composite plastics material panels 2. The plant 38 comprises mechanisms 39 and 40, for example mills or willowing machines, for comminuting soft polyurethane foam alone or with synthetic coating, fabric, scrap and the like, to grain sizes of between 2mm and 20 mms, for example. The comminuting mechanism 39 being constructed as a scrap mill. Hard polyurethane scraps such as integral or coated pieces can be ground in the comminuting mechanism 40 which is constructed as a mill or grinder, or thermoplastic plastics material scrap can also be ground up to corresponding grain sizes in the mechanism 40. Different filler materials, for example cork granulate, rubber granulate, chalk or calcium carbonate, can be kept in stock in storage containers 41 and 42. The last mentioned materials may be used as filler materials in the production of composite plastics material panels 2. The individual soft foam scraps emerging from the comminuting mechanism 39 the hard scraps emerging from the communuting melchanism 40 or the filler materials from the storage containers 41 and 42, are conveyed to scales 43 and supplied in the appropriate dosage to a mixing drum 44 according to a scheduled mixture ratio for the particular panel 2 to be produced. Once the individual components, anhydrous components, have been fed into the mixing drum 44, they are mixed to produce a desired mixture ratio between the individual filler materials and the foamed material granulate, respectively. Raw material drawn from tanks 48 and 49 by way of a mixer head 45, by means of pumps 46 and 47 is then fed into the mixing drum 44 with the required mixture ratio, and the mixing operation is continued until intermixing of the liquid raw material and the foamed material granulate or filler material has been achieved. Polyol may for example be provided in the tank 48 for example, and isocyanate in the tank 49. The raw material mixed with the foamed material granulate and the filler materials is then placed in an ingot or block mould 50, which may if appropriate, be kept at desired processing temperature by means of a heating device 51. The heating device 51 can be heated by means of hot liquids, gases or by means of electrical heating bars.

The mould 50 is provided with a supply pipe 52 and an inlet opening 53. Vapour, for example steam, may for example, be fed into the mould 50 during the foaming operation or following the expansion of the raw material, thereby reducing the reaction period and accelerating the completion of the reaction or curing of the foamed material block or slab 54.

The foamed material block or slab 54 and the foamed material granulates and filler materials included therein by expansion, are then fed to a cutter mechanism 55 in which the foamed material block 54 is cut up into individual composite plastics material panels 2 of the required thickness. The panels 2 are fed to a heating device 57 which may, for example, be constituted by a heating plate, for example by means of a conveyor 56. The panels 2 are preheated to a temperature of between 170° and 220° C. so that a uniform compaction, or rather deformation, of the cellular lattice 14 can take place during the subsequent deformation, described above with reference to FIGS. 1 to 7.

The preheated panel 2 is placed in a press mould 58 together for example with a covering layer 24 and a fusible adhesive foil 25. A press plunger 60 is forced into the mould 58 via press drive units 59, which are for example hydraulic cylinder and piston units, to deform the panel 2 as well as the covering layer 24 and the fusible adhesive foil 25, whilst the heat originating from the panel 2 liquifies the fusible adhesive foil 25 and causes the covering layer 24 and the panel 2 to be bonded together. The press plunger 60 may be provided with a heating system 61 which may for example be kept at 170° to 220° by means of hot steam, hot gases, electrically, or by the circulation of commensurately heated fluid. If the drive units 59 are hydraulic units, force may be exerted on the press plunger 60 by means of a hydraulic pump 62, of at least such a magnitude that the panel 2 is forced against the press mould 58 under a pressure of 10 bars. At the process temperature of 170° to 220° C. specified, such pressure is usually adequate to compact the panel 2 or several composite plastics material panels to the required extent. For greater compaction to produce higher densities of the composite plastics material panels, higher pressures may be exerted on the press plunger 60 by means of the hydraulic pump 62.

The encircling edges of the press plunger 60 are constructed as cutting edges 63 and are held above the press mould 58 at a distance of 0.05 mm to 0.5 mm during the application of thermal and pressure stress to the panel 2. Once the processing period has elapsed and a remanent deformation of the composite plastics material panel 2 has thereby been achieved, the press plunger 60 is lowered by said distance and is pressed against the press mould 58, thereby parting off protrusions 64 which emerged through the small gap between the cutting edges 63 and the press mould 58 during the deformation of the panel 2. A finished trimmed shaped element is thereby obtained.

For carrying out the method of the invention, any suitable apparatus other than the plant 38, may be used for the production of composite plastics material panels 2, and for trimming, heating and deforming them, provided that said other apparatus can generate the specified temperatures and pressures.

What is claimed is:

1. A shaped element comprising a panel of a soft foamed material having a cellular lattice comprised of webs defining open cells and granules of a soft foamed material having a cellular lattice comprised of webs defining cells and of at least one additional filler material, the granules having a grain size of 2 mm to 20 mm and being distributed throughout the panel of soft foamed material, and the webs of the cellular lattices being permanently deformed.

2. The shaped element of claim 1, wherein the soft foamed material is elastic.

3. The shaped element of claim 1, wherein the additional filler material is selected from the group consisting of cork granulate, rubber granulate, chalk, calcium carbonate, hard polyurethane scrap and thermoplastic scrap.

4. The shaped element of claim 1, comprising a plurality of said panels and an adhesive layer bonding adjacent ones of said panels together, the soft foamed material and granules of the panels being compacted to varying densities.

5. The shaped element of claim 4, wherein the weight proportions of the granules in the panels are different.

6. The shaped element of claim 4, wherein the adhesive layer is comprised of a fusible material.

7. The shaped element of claim 4, wherein at least one of the panels defines a recess, and further comprising a reinforcing element mounted in the recess.

8. The shaped element of claim 4, wherein the webs of the cellular lattices are deformed permanently to a different extent in the panels and the panels have different densities while containing substantially the same proportion of the granules.

9. The shaped element of claim 1, wherein the panel is spatially deformed.

10. The shaped element of claim 1, wherein the soft foamed material of the panel has been compacted to different densities over different portions of the panel.

11. A process for the production of a shaped element, comprising the steps of
(a) mixing a liquid synthetic resin material capable of forming a soft foamed material with granules of a soft foamed material having a cellular lattice comprised of webs defining cells and of at least one additional filler material, the granules having a grain size of 2 mm to 20 mm, until the granules are distributed throughout the liquid synthetic resin material to obtain a mixture of the liquid synthetic resin material and the granules, (b) placing the mixture in a block mold, (c) reacting the liquid synthetic resin material in the mold until a block of soft foamed material having a cellular lattice comprised of webs defining open cells and having the granules distributed therethrough has been produced, (d) dividing the block into panels having a substantially equal density throughout, (e) subjecting the panels to a temperature of about 120° to 250° C., and (f) permanently deforming and shaping the panels under the simultaneous action of heat and pressure until at least portions of the panels have a higher density than the original density of the panels.

12. The process of claim 11, wherein the mixture comprises, by weight, up to 50 parts of the additional filler material granules, 5 to 25 parts of the liquid synthetic resin material and up to 100 parts of the soft foamed material granules.

13. The process of claim 11, comprising the steps of first thoroughly mixing the granules and then thoroughly mixing the liquid synthetic resin material with the thoroughly mixed granules.

14. The process of claim 11, comprising the further steps of placing a layer of a fusible adhesive material on at least one surface of the panels before the panels are subjected to said temperature, and bonding adjacently placed ones of said panels together by subjecting the panels to said temperature and thereby fusing the adhesive layer material before permanently deforming and shaping the panels.

15. The process of claim 14, wherein the adjacently placed panels have different thicknesses.

16. The process of claim 14, comprising the further step of inserting a reinforcing element in recesses between the adjacently placed panels.

17. The process of claim 11, comprising the further steps of placing a preheated one of the panels in a press mold before the panel is permanently deformed and shaped in said press mold until at least portions of the panel have a higher density than the original density of the panel, placing a fusible layer of an adhesive material on one surface of said panel, placing another panel in the press mold over the fusible layer, and permanently deforming and shaping the other panel in said press mold while fusing the adhesive material to bond the other panel to the surface until at least portions of the other panel have a density different from the density of the one panel.

* * * * *